United States Patent
He et al.

(10) Patent No.: US 11,335,179 B1
(45) Date of Patent: May 17, 2022

(54) WATER ENVIRONMENT RISK PREDICTION AND EARLY WARNING METHOD

(71) Applicant: NANJING INSTITUTE OF ENVIRONMENTAL SCIENCES, MINISTRY OF ECOLOGY AND ENVIRONMENT OF THE PEOPLE'S REPUBLIC OF CHINA, Nanjing (CN)

(72) Inventors: Fei He, Nanjing (CN); Weixin Li, Nanjing (CN); Bin Xu, Nanjing (CN); Zhuang Liu, Nanjing (CN); Jianying Chao, Nanjing (CN); Yufeng Xie, Nanjing (CN); Wei Zhuang, Nanjing (CN); Hanbei Du, Nanjing (CN); Jian Li, Nanjing (CN)

(73) Assignee: NANJING INSTITUTE OF ENVIRONMENTAL SCIENCES, MINISTRY OF ECOLOGY AND ENVIRONMENT OF THE PEOPLE'S REPUBLIC OF CHINA, Nanjing (CN)

( * ) Notice: Subject to any disclaimer, the term of this patent is extended or adjusted under 35 U.S.C. 154(b) by 0 days.

(21) Appl. No.: 17/609,991

(22) PCT Filed: Dec. 28, 2020

(86) PCT No.: PCT/CN2020/140224
§ 371 (c)(1),
(2) Date: Nov. 9, 2021

(87) PCT Pub. No.: WO2021/174971
PCT Pub. Date: Sep. 10, 2021

(30) Foreign Application Priority Data

Aug. 3, 2020 (CN) .......................... 202010765484.4

(51) Int. Cl.
*G08B 21/18* (2006.01)
*G06N 3/08* (2006.01)

(52) U.S. Cl.
CPC .............. *G08B 21/18* (2013.01); *G06N 3/08* (2013.01)

(58) Field of Classification Search
CPC .................................. G08B 21/18; G06N 3/08
USPC ......................................................... 340/603
See application file for complete search history.

(56) References Cited

U.S. PATENT DOCUMENTS

| 2014/0156190 A1* | 6/2014 | Cordazzo ............... G06Q 10/04 |
| | | 702/3 |
| 2018/0373993 A1 | 12/2018 | Petty |
| 2019/0316309 A1* | 10/2019 | Wani ....................... G06F 30/20 |
| 2019/0325334 A1* | 10/2019 | Kuo ......................... G08B 31/00 |
| 2020/0184795 A1* | 6/2020 | Han ........................... G06T 7/10 |

FOREIGN PATENT DOCUMENTS

| CN | 104992245 A | 10/2015 |
| CN | 105426993 A | 3/2016 |
| CN | 107609742 A | 1/2018 |
| CN | 108009736 A | 5/2018 |
| CN | 111861274 A | 10/2020 |

OTHER PUBLICATIONS

International Search Report, issued in PCT/CN2020/140224, dated Apr. 30, 2021.
Written Opinion of the International Searching Authority, issued in PCT/CN2020/140224, dated Apr. 30, 2021.

\* cited by examiner

*Primary Examiner* — Juan Atorres
(74) *Attorney, Agent, or Firm* — Birch, Stewart, Kolasch & Birch, LLP

(57) ABSTRACT

A risk prediction and early warning method for water environments based on a water environment model predicting pollution discharge information for all pollution sources in a watershed, and including: selecting pollution sources requiring environmental risk prediction and early warning and dividing these into different risk prediction/early warning levels; determining from official environmental monitoring data and literature research initial elements for environmental pollution risk evaluation; obtaining principal pollution elements affecting pollution events; generating a plurality of environmental risk prediction and early warning models; forming a comprehensive fuzzy risk prediction and early warning model by combining the several risk prediction and early warning models having the best selective performance; inputting principal pollution element values into the comprehensive fuzzy risk prediction and early warning model, and predicting risk values for pollution events at pollution sources. The present method realizes prediction of watershed pollution risk, and resolves present deficiencies in watershed pollution risk prediction and early warning, while improving coverage rates for watershed pollution risk prediction and enhancing the accuracy thereof.

4 Claims, No Drawings

WATER ENVIRONMENT RISK PREDICTION AND EARLY WARNING METHOD

FIELD OF THE INVENTION

The invention relates to the technical field of water environment management, and specifically relates to a water environment risk prediction and early warning method.

BACKGROUND OF THE INVENTION

The water environment risk prediction method is the key technology for the early warning and emergency response of sudden water pollution in a watershed. In recent years, with the development of quantitative, systematic, and informatized environmental management, the technical requirements for emergency management of water environment accidents have become higher and higher. Especially when a water environment pollution accident occurs, the accident process can be quickly simulated and emergency response can be performed. The use of advanced information technologies such as network, computer simulation and database management systems to establish a water pollution accident impact prediction and early warning technology system is a hot topic of current research. The advantage of this model calculation is that it can not only numerically simulate and analyze the physical and chemical conditions of the water environment, but also combine computer simulation technology to visually display the accident simulation process, and provide the urgently needed decision-making basis for the management and decision-making level to respond quickly.

At present, the technical research and application of water pollution accident impact prediction and early warning are generally developed and customized for the determination of pollution source monitoring points, and they lack the generality and universality of environmental analysis and prediction of the entire river basin.

SUMMARY OF THE INVENTION

Technical Problem

The purpose of the present invention is to provide a water environment risk prediction and early warning method suitable for river basin.

The Solution to the Problem

The specific technical solutions are:

A water environment risk prediction and early warning method, including the following steps:

(1) Predict the discharge information of all pollution sources in the watershed based on the water environment model;

(2) Screening the pollution sources in the watershed based on the pollution discharge information, and selecting the pollution sources that require environmental risk prediction and early warning;

(3) Pollution sources that require environmental risk prediction and warning are classified into different risk prediction and warning levels according to their basic pollution index parameters; different pollution sources are predicted according to their risk prediction and warning levels corresponding to the risk prediction and warning period;

(4) Preliminarily determine the elements of environmental pollution risk assessment from environmental monitoring department data and literature research;

(5) Screen the preliminarily determined element pollution elements to obtain the main element pollution elements that affect the pollution incident;

(6) Collect historical pollution event data, and based on the identified main elements, train the deep learning model of Naive Bayes, Random Forest, KNN Nearest Neighbor Classification, Support Vector Machine, Decision Tree, and high-resolution remote sensing image recognition technology based on Convolutional Neural Network, which generate multiple environmental risk prediction and early warning models;

(7) Evaluate the performance of the environmental risk prediction and early warning model generated by the deep learning model training of Naive Bayes, Random Forest, KNN Nearest Neighbor Classification, Support Vector Machine, Decision Tree and high-resolution remote sensing image recognition technology based on Convolutional Neural Network, select several risk prediction and early warning models with the best performance jointly form a fuzzy comprehensive risk prediction and early warning model;

(8) Through the integrated application of high-precision remote sensing environmental monitoring technology and sensor network technology, the value of the main element pollution element corresponding to the pollution source that needs risk prediction and early warning is collected, and the value of the main element pollution element is input into the fuzzy comprehensive risk prediction and early warning model jointly formed. Predict the risk value of the pollution source pollution event.

Among them, the classification of different risk prediction and early warning levels according to their basic pollution index parameters is specifically:

Set the weights of historical pollution discharge volume, pollutant types, pollutant characteristics, pollutant discharge points, and pollution event impact range as w1, w2, w3, w4, w5, where w1+w2+w3+w4+w5=1; The risk assessment value of the pollution event corresponding to the pollution source is:

$$V=V1*w1+V2*w2+V3*w3+V3*w4+V5*w5$$

Among them, V1, V2, V3, V4, and V5 are the values of historical pollution emissions, pollutant types, pollutant characteristics, pollutant discharge points, and pollution event impact range respectively;

The value of historical pollution discharge is the ratio of the historical pollution discharge of this pollution source to the average value of historical pollution discharge across the country; the value of the pollutant type is the value assigned to different types of pollutants. The more severe the damage of the pollution, the corresponding higher value of the pollutant type; the higher the pollutant characteristics are values assigned to different concentrations, the higher the hazard, the higher the corresponding pollutant characteristic value; the more pollutant emission points, the higher corresponding pollutant emission point distribution value; the pollution incident is assigned to different impact ranges, the greater the impact on the ecological environment, the higher the impact range of the corresponding pollution event;

Based on the calculated risk assessment value, the pollution source is classified into the corresponding risk prediction and warning level. The higher the risk assessment value, the higher the risk prediction and warning level.

The evaluation method of the fuzzy comprehensive risk prediction and early warning model includes establishing the membership function according to the hierarchical structure relationship among the target layer, the system layer, the criterion layer, and the index layer, and calculating the membership degree of each pollution element to the risk prediction and early warning level; According to the relationship of each level of the pollution element system, the structure model is established, and the fuzzy relationship matrix is established through the relative membership function; the final risk prediction and early warning result is determined according to the principle of maximum membership.

Further, the risk prediction and early warning method further includes adopting a sampling evaluation method to assess pollution sources in a river basin:

Calculate the proportion of the number of pollution sources corresponding to the warning level of each pollution source pollution event to the total number of pollution sources in the watershed, set the total number of samples to be sampled, and calculate the number of samples corresponding to each pollution event warning level according to the total number of samples and the proportion of each pollution event warning level;

Randomly select pollution sources with a corresponding number from the pollution sources of each pollution event warning level;

Extract from pollution sources that do not require environmental risk prediction and warning until the number of pollution sources sampled reaches the total number of samples those sampled;

Based on the sampled pollution source samples, the overall pollution event risk value of the watershed is calculated, and the average value of the pollution event risk value of all pollution sources sample is taken as the pollution event risk value of the watershed pollution source.

Advantages of the Invention

Advantages

The advantages of the present invention mainly include:

Compared with the current technology, the present invention has the following advantages:

(1) The present invention realizes the prediction of the pollution risk of the river basin, overcomes the problem of low efficiency of the existing single-point risk prediction and processing, and makes up for the vacancy of the existing river basin pollution risk prediction and early warning;

(2) Due to the complexity of the single point prediction and processing of each pollution source, the existing watershed pollution risk prediction and early warning coverage is low, and effective supervision of a large number of pollution sources has not been realized. The present invention simultaneously supervises all pollution sources in the watershed, and increase forecast coverage of the pollution risk;

(3) The invention screens the pollution sources that need risk prediction and early warning, and predicts the pollution sources that need risk prediction and early warning according to different risk prediction and early warning levels and with different risk prediction and early warning period, which overcomes the shortage and stubborn of existing pollution risk prediction and warning methods. The invention reduces the complexity of pollution source risk prediction and early warning while supervising the safety of a large number of pollution sources;

(4) The invention trains and generates multiple pollution risk prediction models, selects several prediction models with the best performance for fuzzy risk prediction, combines the advantages of multiple risk prediction models, and improves the accuracy of risk prediction.

THE BEST EMBODIMENT FOR IMPLEMENTING THE INVENTION

The Best Mode of the Present Invention

The present invention will be further described below in conjunction with specific embodiments, but the protection scope of the present invention is not limited to this.

Constructing a watershed environmental risk prediction and early warning system, including:

The pollution information module is used to predict the pollution information of all pollution sources in the watershed based on the water environment model;

The primary screening module is used to screen pollution sources in the watershed based on the pollution discharge information, and select pollution sources that require environmental risk prediction and early warning;

The classification module is used to classify pollution sources that require environmental risk prediction and early warning into different risk prediction and early warning levels based on their basic pollution index parameters; different pollution sources are predicted according to their risk prediction and early warning periods corresponding to their risk prediction and early warning periods;

The element pollution element determination module is used to preliminarily determine the element pollution elements of the environmental pollution risk assessment from the environmental monitoring department data, the National Meteorological Information Center and literature research;

The secondary screening module is used to screen the preliminarily determined element pollution elements and obtain the main element pollution elements that affect the pollution event;

The training module is used to collect historical pollution event data, and based on the main elements of the identified pollution elements, it can train Naive Bayes, Random Forest, KNN Nearest Neighbor Classification, Support Vector Machine, Decision Tree, and deep learning model of image recognition technology high-resolution remote sensing based on convolutional neural network to generate multiple environmental risk prediction and early warning models;

Evaluation module, used to evaluate the environmental risk prediction and early warning generated by deep learning model training based on Naive Bayes, Random Forest, KNN Nearest Neighbor Classification, Support Vector Machine, Decision Tree, and high-resolution remote sensing image recognition technology based on convolutional neural network Model performance, select several risk prediction and early warning models with the best performance to form a fuzzy comprehensive risk prediction and early warning model;

The prediction module is used to collect the value of the main element pollution element corresponding to the risk prediction and early warning pollution source through the application of high-precision remote sensing environmental monitoring technology and sensor network technology integration, and input the value of the main element pollution element into the fuzzy synthesis formed by the joint Risk prediction and early warning model to predict the risk value of pollution incidents from pollution sources.

INVENTION EMBODIMENT

Embodiments of the Present Invention

Example 1

The specific water environment risk prediction and early warning method includes the following steps:

(1) Predict the discharge information of all pollution sources in the watershed based on the water environment model;

(2) Screening the pollution sources in the watershed based on the pollution discharge information, and selecting the pollution sources that require environmental risk prediction and early warning;

(3) Pollution sources that require environmental risk prediction and warning are classified into different risk prediction and warning levels according to their basic pollution index parameters; different pollution sources are predicted according to their risk prediction and warning levels corresponding to the risk prediction and warning period;

According to its basic pollution index parameters, the different risk prediction and early warning levels are specifically as follows:

Set the weights of historical pollution discharge volume, pollutant types, pollutant characteristics, pollutant discharge points, and pollution event impact range as w1, w2, w3, w4, w5, where w1+w2+w3+w4+w5=1; The risk assessment value of the pollution event corresponding to the pollution source is:

$$V=V1*w1+V2*w2+V3*w3+V3*w4+V5*w5$$

Among them, V1, V2, V3, V4, and V5 are the values of historical pollution discharge volume, pollutant types, pollutant characteristics, pollutant discharge points, and pollution event impact range respectively;

The value of historical pollution discharge is the ratio of the historical pollution discharge of this pollution source to the average value of historical pollution discharge across the country; the value of the pollutant type is the value assigned to different types of pollutants. The more severe the damage of the pollution, the corresponding higher the value of the pollutant type; the higher the pollutant characteristics are values assigned to different concentrations, the higher the hazard, the higher the corresponding pollutant characteristic value, the more pollutant emission points, the higher the corresponding pollutant emission point distribution value; the pollution incident. The value of the impact range is assigned to different impact ranges. The greater the impact on the ecological environment, the higher the impact range of the corresponding pollution event;

Based on the calculated risk assessment value, the pollution source is classified into the corresponding risk prediction and warning level. The higher the risk assessment value, the higher the risk prediction and warning level.

(4) Preliminarily determine the elements of environmental pollution risk assessment from environmental monitoring department data and literature research;

(5) Screen the preliminarily determined element pollution elements to obtain the main element pollution elements that affect the pollution incident;

(6) Collect historical pollution event data, and based on the identified main elements, train the deep learning model of Naive Bayes, Random Forest, KNN Nearest Neighbor Classification, Support Vector Machine, Decision Tree, and high-resolution remote sensing image recognition technology based on Convolutional Neural Network, which generate multiple environmental risk prediction and early warning models;

(7) Evaluate the performance of the environmental risk prediction and early warning model generated by the deep learning model training of Naive Bayes, Random Forest, KNN Nearest Neighbor Classification, Support Vector Machine, Decision Tree and high-resolution remote sensing image recognition technology based on Convolutional Neural Network, select several risk prediction and early warning models with the best performance jointly form a fuzzy comprehensive risk prediction and early warning model;

The evaluation method of the fuzzy comprehensive risk prediction and early warning model includes establishing the membership function according to the hierarchical structure relationship among the target layer, the system layer, the criterion layer, and the index layer, and calculating the membership degree of each pollution element to the risk prediction and early warning level; According to the relationship of each level of the pollution element system, the structure model is established, and the fuzzy relationship matrix is established through the relative membership function; the final risk prediction and early warning result is determined according to the principle of maximum membership.

(8) Through the integrated application of high-precision remote sensing environmental monitoring technology and sensor network technology, the value of the main element pollution element corresponding to the pollution source that needs risk prediction and early warning is collected, and the value of the main element pollution element is input into the fuzzy comprehensive risk prediction and early warning model jointly formed. Predict the risk value of the pollution source pollution event.

Example 2

On the basis of Example 1, the risk prediction and early warning method further includes adopting a sampling evaluation method to assess pollution sources in a river watershed:

Calculate the proportion of the number of pollution sources corresponding to the warning level of each pollution source pollution event to the total number of pollution sources in the watershed, set the total number of samples to be sampled, and calculate the number of samples corresponding to each pollution event warning level according to the total number of samples and the proportion of each pollution event warning level;

Randomly select a corresponding number of pollution sources from the pollution sources of each pollution event warning level;

Extract pollution sources from the pollution sources those do not require environmental risk prediction and warning, until the number of pollution sources sampled reaches the total number of samples sampled;

Based on the sampled pollution source samples, the overall pollution event risk value of the watershed is calculated, and the average value of the pollution event risk value of each pollution source sample is taken as the pollution event risk value of the watershed pollution source.

The invention claimed is:

1. A water environment risk prediction and early warning method comprising the following steps:

predicting the discharge information of all pollution sources in the watershed based on the water environment model;

screening the pollution sources in the watershed based on the pollution discharge information, and selecting the pollution sources that require environmental risk prediction and early warning;

pollution sources that require environmental risk prediction and early warning are classified into different risk prediction and early warning levels according to their basic pollution index parameters; different pollution sources are predicted according to the risk prediction and early warning period corresponding to their risk prediction and early warning levels;

preliminarily determining the elements of environmental pollution risk assessment from environmental monitoring department data and literature research;

screening the preliminarily determined element pollution elements to obtain the main element pollution elements that affect the pollution incident;

collecting historical pollution event data, and based on the identified main elements, train the deep learning model of Naive Bayes, Random Forest, KNN Nearest Neighbor Classification, Support Vector Machine, Decision Tree, and high-resolution remote sensing image recognition technology based on convolutional neural network, which generate multiple environmental risk prediction and early warning models;

evaluating the performance of the environmental risk prediction and early warning model generated by the deep learning model training of Naive Bayes, Random Forest, KNN Nearest Neighbor Classification, Support Vector Machine, Decision Tree and high-resolution remote sensing image recognition technology based on convolutional neural network, select several risk prediction and early warning models with the best performance jointly form a fuzzy comprehensive risk prediction and early warning model; and through the integrated application of high-precision remote sensing environmental monitoring technology and sensor network technology, the value of the main element pollution element corresponding to the pollution source that needs risk prediction and early warning is collected, and the value of the main element pollution element is input into the fuzzy comprehensive risk prediction and early warning model jointly formed, predicting the risk value of the pollution source pollution event.

2. The water environment risk prediction and early warning method according to claim 1, wherein the classification into different risk prediction and early warning levels according to its basic pollution index parameters is specifically:

set the weights of historical pollution discharge volume, pollutant types, pollutant characteristics, pollutant discharge points, and pollution event impact range as w1, w2, w3, w4, w5, where w1+w2+w3+w4+w5=1; the risk assessment value of the pollution event corresponding to the pollution source is:

$$V=V1*w1+V2*w2+V3*w3+V3*w4+V5*w5$$

among them, V1, V2, V3, V4, and V5 are the values of historical pollution discharge volume, pollutant types, pollutant characteristics, pollutant discharge points, and pollution event impact range respectively; the value of historical pollution discharge is the ratio of the historical pollution discharge of this pollution source to the average value of historical pollution discharge across the country; the value of the pollutant type is the value assigned to different types of pollutants; the more severe the damage of the pollution, the corresponding higher the value of the pollutant type; the higher the pollutant characteristics are values assigned to different concentrations, the higher the hazard, the higher the corresponding pollutant characteristic value, the more pollutant emission points, the higher the corresponding pollutant emission point distribution value; the pollution incident; the value of the impact range is assigned to different impact ranges; the greater the impact on the ecological environment, the higher the impact range of the corresponding pollution event; and based on the calculated risk assessment value, the pollution source is classified into the corresponding risk prediction and warning level; the higher the risk assessment value, the higher the risk prediction and warning level.

3. The water environment risk prediction and early warning method according to claim 1, wherein the evaluation method of the fuzzy comprehensive risk prediction and early warning model includes establishing the membership function according to the hierarchical structure relationship among the target layer, the system layer, the criterion layer, and the index layer, and calculating the membership degree of each pollution element to the risk prediction and early warning level; according to the relationship of each level of the pollution element system, the structure model is established, and the fuzzy relationship matrix is established through the relative membership function; the final risk prediction and early warning result is determined according to the principle of maximum membership.

4. The water environment risk prediction and early warning method according to claim 1, wherein the risk prediction and early warning method further includes adopting a sampling evaluation method to assess pollution sources in a river watershed:

calculating the proportion of the number of pollution sources corresponding to the warning level of each pollution source pollution event to the total number of pollution sources in the watershed, set the total number of samples to be sampled, and calculate the number of samples corresponding to each pollution event warning level according to the total number of samples and the proportion of each pollution event warning level;

randomly selecting a corresponding number of pollution sources from the pollution sources of each pollution event warning level;

extracting pollution sources from the pollution sources those do not require environmental risk prediction and warning, until the number of pollution sources sampled reaches the total number of samples sampled; and based on the sampled pollution source samples, the overall pollution event risk value of the watershed is calculated, and the average value of the pollution event risk value of each pollution source sample is taken as the pollution event risk value of the watershed pollution source.

* * * * *